006e
UNITED STATES PATENT OFFICE.

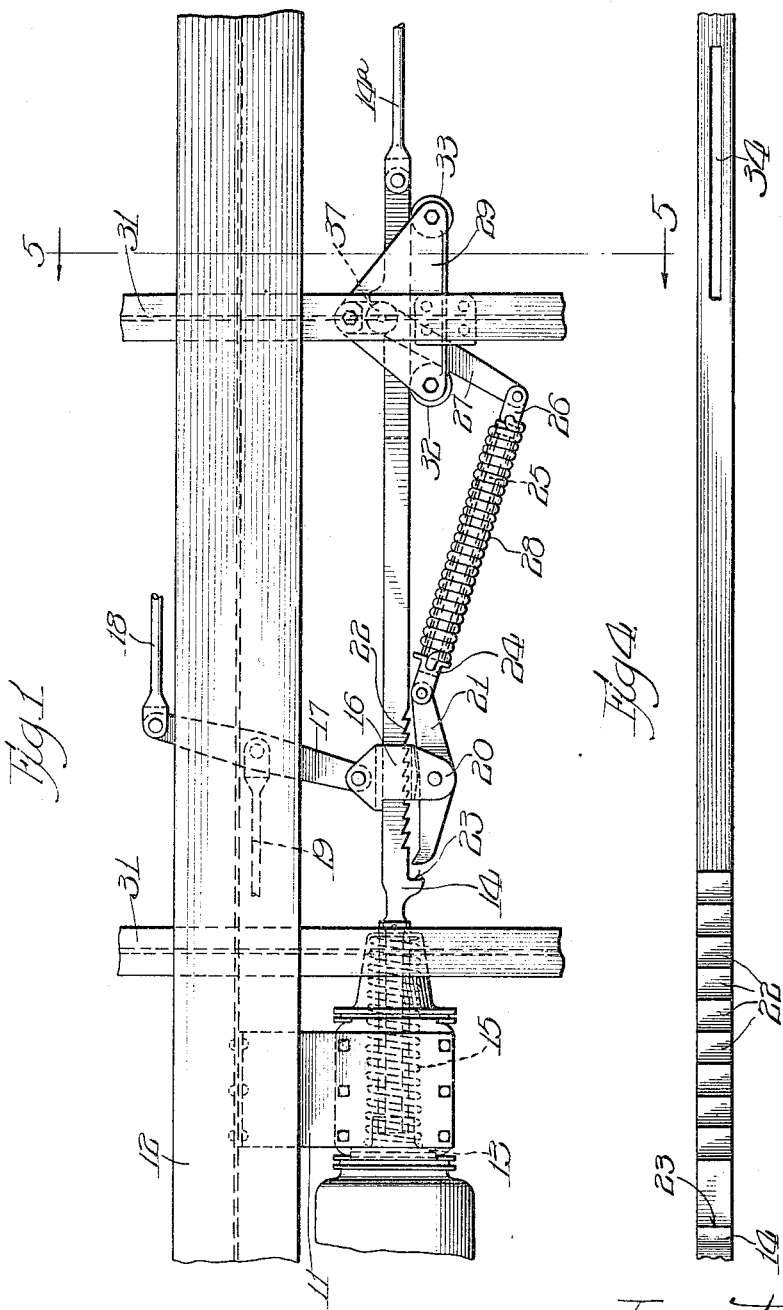

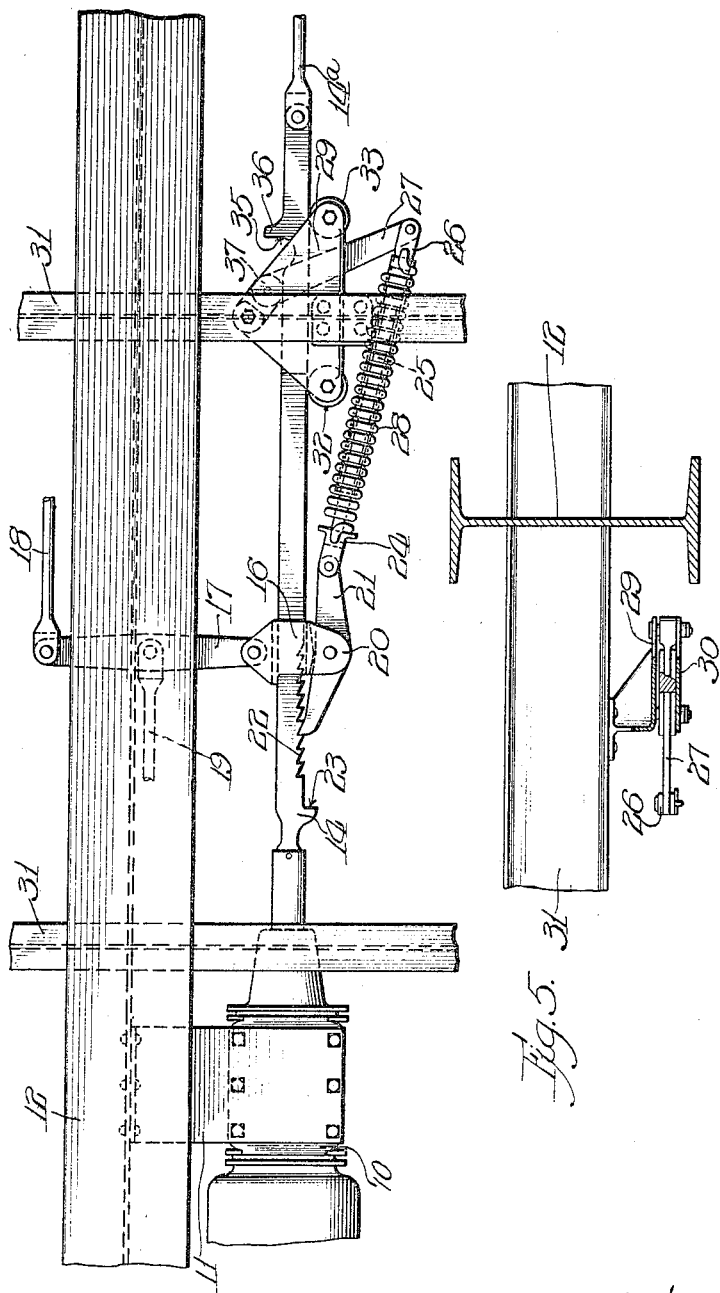

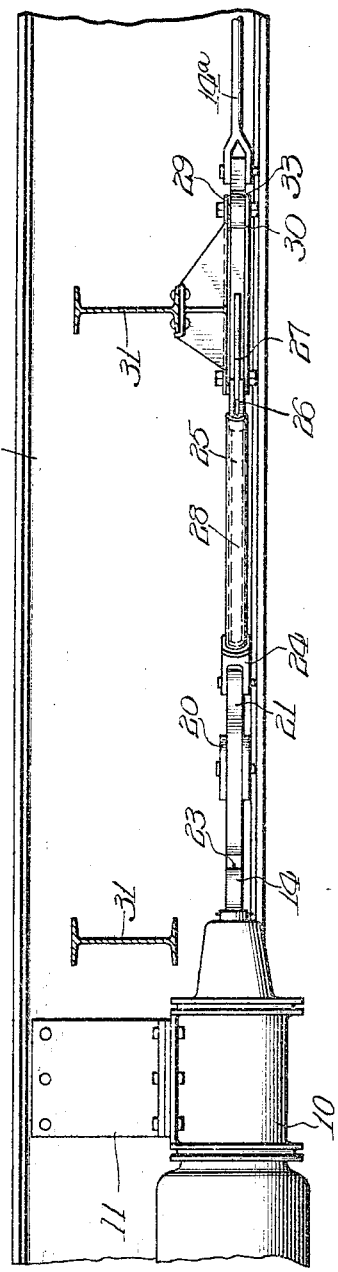

WILLARD G. RANSOM, OF DAVENPORT, IOWA.

BRAKE-OPERATING MECHANISM.

1,282,288.     Specification of Letters Patent.     Patented Oct. 22, 1918.

Application filed February 8, 1918. Serial No. 216,116.

*To all whom it may concern:*

Be it known that I, WILLARD G. RANSOM, a citizen of the United States of America, and resident of Davenport, Scott county, Iowa, have invented a certain new and useful Improvement in Brake-Operating Mechanisms, of which the following is a specification.

My invention relates to an improvement in brake operating mechanisms, and has for its object the provision of means for efficiently and effectively applying the braking power to the wheels irrespective of the amount of brake shoe wear and the slackness of the intermediate connecting links.

In existing brake mechanisms wherein the application of the brake shoes to the car wheels is effected by the movement of a push-rod or piston controlled by an air brake cylinder, the extent of piston travel is dependent in a large degree upon the thickness of the brake shoes, the piston travel increasing as the brake shoes wear away, and the yield in the various connecting links. When the wear of the shoes and the looseness of the connections are excessive, the piston travel is so great that the effective pressure on the piston is greatly reduced and thus the efficiency of the device as a retarding agency is lessened, if not entirely destroyed. Excessive piston travel also necessitates an excessive consumption of air.

Heretofore, many mechanical and pneumatic devices have been designed to automatically compensate for this increased travel of the piston by bringing about a certain adjustment of the connecting links whenever the piston travels an excessive distance, whereby on the next application of the brake it is unnecessary to move the piston this excessive distance in order to obtain the brake application. Such devices are objectionable, however, as they necessitate one or more applications of the brakes before the desired adjustment is obtained, and, furthermore, it is found that oftentimes the adjustment is made to such an extent that upon the release the brakes are not moved out of contact with the wheels and thus retard the train operation.

By my invention, I provide means for quickly and efficiently taking up all slack in the connections and moving the shoes into contact with the wheels by means of a small initial movement of the piston, and then the further movement of the piston is effective for the purpose of applying the braking power. More specifically, by my construction I first provide a quick motion, low-power connection between the piston and the brakes for the purpose of moving the brake shoes against the wheels, and then change directly to a slow motion, high-power connection for applying the braking force. By my construction, therefore, it is unnecessary to first make one or more brake applications in order to obtain proposed adjustment of parts, as in previous structures, and furthermore the brakes on the release are moved clear of the wheels so as not to interfere with the train movement.

These and other objects of my invention will be more readily understood by having reference to the accompanying drawings in which I have illustrated one particular embodiment of my invention.

In the drawings—

Figure 1 is a plan view of my device, showing the relative position of the parts when the brakes are released.

Fig. 2 is a plan view, similar to Fig. 1, showing the relative position of the parts when the brakes are set.

Fig. 3 is a side elevation of the parts as shown in Fig. 1.

Fig. 4 is a detail of the push-rod.

Fig. 5 is a sectional view taken on the line 5—5 of Fig. 1.

Fig. 6 is a diagrammatic view of the braking apparatus.

In the drawings, I have shown an air brake cylinder 10 of standard construction, secured by a bracket 11 to the center sill 12. Within this cylinder is located the usual piston 13 carried by a push-rod 14, a spring 15 being provided for the purpose of returning the parts to their normal position. The opposite end of this push-rod is connected through suitable connections 14ᵃ to the hand-operating mechanism whereby this rod can be operated to set the brakes either by power-operated or hand-operated means. Mounted on this push-rod there is a sliding block 16, to which one end of the brake lever 17 is connected. Pivotally connected to the opposite end of this lever is a brake-rod 18, and at an intermediate point on the lever the brake-rod 19 is connected, these brake-rods extending to the floating levers mounted on opposite ends of the car through which the power is applied to the brakes, in the usual and well known manner.

The sliding block 16 is provided with a pair of outwardly extending ears 20 between which a pawl 21 is pivotally mounted, this pawl being adapted to engage with a plurality of ratchet teeth 22 formed on one side of the push-rod. The stop 23 is likewise provided on the rod to limit the movement of the pawl and block in that direction. Connected to the tail of the pawl 21, there is a stem 24 which telescopes within a tubular member 25 secured to the member 26, which in turn is pivotally connected to a bent lever 27. Surrounding the tubular member 25 there is a spiral spring 28, one end of which is secured near one end of the member 25, while the opposite end of the spring is connected to the member 26. In this way the pawl 21 and lever 27 are secured together by a spring connection which can be elongated through the expansion of the spring, the telescoping action of the parts permitting such expansion and contraction. The opposite end of the bent lever 27 is pivotally connected between two triangular plates 29 and 30, the upper plate being carried by the transom 31, as clearly shown in Fig. 5. These two plates are mounted one above and one below the push-rod 14 which engages with two rollers 32 and 33 mounted between these plates. The push-rod is provided with an elongated slot 34, through which the bent lever 27 extends. One side of the push-rod is likewise provided with a circular depression 35, one side of which is extended forming a projection 36. A roller 37 is mounted at the angle in the bent lever 27, and in the normal position of the parts, as shown in Fig. 1, this roller is adapted to rest within the circular depression 35 in the push-rod.

The operation of the device is as follows: When the air is admitted to the cylinder 10, the piston and push-rod 14 are forced to the right, as shown in Figs. 1 and 2. This movement of the push-rod causes the bent lever 27 to swing about its pivot, owing to the engagement of the roller 37 in the circular depression 35. The movement of the lever 27 operates through the spring connection 28 to draw the sliding block 16 along the push-rod. This movement of the sliding block rocks the brake-lever 17 and operates through the brake-rods 18 and 19 to move the brake-shoes from their inoperative or released position to a position in contact with the car wheels. It will be noticed that by reason of the relative distances between the roller 37 and the pivot point of the lever 27, and the distance between this roller and the outer end of this lever which is connected to the member 26, that a relatively small movement of the push-rod 14 causes a greatly increased or multiplied movement of the member 26, and thus of the block 16. Furthermore, this would be a low-powered connection to the brakes, but is of sufficient power to move the shoes quickly from their released position to a position adjacent to the wheels at which time the parts have been brought in the position shown in Fig. 2— that is, the sliding block 16 has been moved along the push-rod and the pawl 21 engages with one of the teeth on this push-rod, which prevents the sliding block from any return movement until the push-rod itself has returned. After a given movement of the piston, the circular depression 35 is moved out of engagement with the roller 37, and thus further movement of the push-rod does not affect the bent lever 27 and the connections therefrom to the sliding block. In case the brake shoes contacted with the wheels before the roller 37 became disengaged from the depression 35, the further movement of this bent lever 27 would be permitted by means of the expansion of the spring 28. The parts having been moved to the position shown in Fig. 2, further movement of the piston and push-rod operated directly on the sliding block through the pawl connection, and in this manner produces a high-power, slow-motion connection to the brake-levers for applying the braking power. Upon release, the movement of the push-rod to the left again brings the roller 37 into engagement with the depression 35 and rocks the bent lever again to its normal position. This movement of the bent lever pushes against the member 24 through the telescopic rod connection, and this pressure being exerted on a line off center of the pawl 21 rocks this pawl so that it disengages with the ratchet teeth 22 so that the sliding block 16 is free to be moved quickly along the rod by means of the quick-acting connections through the bent lever 27. Thus the brakes are quickly released and disengaged from the wheels.

It will thus be seen that I have devised a very efficient mechanism for quickly taking up all slack in the connections due either to the wear on the brake shoes or to the looseness of the parts, and this slack is taken up through a quick-acting low-power connection whereby a small movement of the piston is necessary to take up all such slack. Thus, but a small amount of air is employed in taking up this slack in the connections, and the rest of the piston stroke is rendered effective to directly operate through a high-power, slow-motion connection to apply the braking power.

Furthermore, it will be seen that the pawl and ratchet through which the high-power braking connection is established is rendered effective as soon as the movement of the brake operating levers is retarded by reason of the brake shoes coming in contact with the car wheels—that is, it is not necessary for the quick motion connection through the bent lever to necessarily complete its movement before the direct operating means can be brought into operation, but if the shoes come in contact with the wheels before the roller 37 is moved out of the depression 35, then further movement of the bent lever operates to expand the spring 28, and likewise pull upon the sliding block, but the main operating force against this block will be directly imparted thereto through the pawl and ratchet connection. This is of importance as in case the brake shoes are new and there is not much slack in the connections, the brake shoes might be brought into contact with the wheels before the roller 37 had moved out of engagement with the depression 35, and if the low-power means alone were operative at this time, it would be insufficient to effectively apply the braking force to the wheels.

Furthermore, it will be noticed that with my construction the quick-motion slack take-up connection is operated by a substantially predetermined amount of force or air pressure irrespective of the amount of slack to be taken up. Thus, in a long train where the amount of slack to be taken up varies on the different cars, a predetermined preliminary air pressure will completely take up the slack on all cars, so that substantially a uniform braking power may be obtained on all cars.

The provision of the sliding block and ratchet connection, I find particularly efficient for bringing about this transference from the quick-acting low-power connection to the slow-acting high-power connection. Furthermore, it will be seen from my construction that the operation of the brakes by the hand-operating mechanism does not in any way affect the adjustment or positioning of the parts so as to interfere with the operation by the power-operating mechanism—that is, my brake-operating mechanism can be operated interchangeably by either power-operated or hand-operated mechanism without in any way interfering with its effective operation.

While I have illustrated and described one particular embodiment of my invention, it will be understood that I do not wish to be limited to the exact construction shown and described, but that various changes and modifications will readily suggest themselves to those skilled in the art without departing from the spirit and scope of my invention.

What I claim as my invention is:

1. A brake-operating mechanism comprising a push-rod, means for applying power to said rod, a block sliding on said rod, a brake-lever operatively connected to said block and having operating connections to the brake shoes, step-up connections between said rod and block whereby a given movement of said rod produces a greater movement of said block for the purpose of initially operating said brake-lever to take up the slack in the connections and move the brake shoes against the wheels, and a direct connection between said rod and block for thereafter applying the braking power.

2. A brake-operating mechanism comprising a push-rod, means for applying power thereto, a block, brake-operating mechanism operatively connected thereto, quick-motion low-power connections between said rod and block for imparting motion to said block on the initial movement of said rod to take up the slack in the operating connections, and slow-motion high-power connections between said rod and block for thereafter applying braking power to said connections.

3. A brake-operating mechanism comprising a push-rod, means for applying power thereto, brake-operating mechanism, quick-motion low-power connections between said rod and brake-operating mechanism for initially operating the same, and slow-motion high-power connections between said rod and mechanism, and means to automatically bring said high-power means into action as soon as the movement of the brake-operating mechanism has been retarded by the brake shoes coming in engagement with the car wheels.

4. A brake-operating mechanism comprising a push-rod, means for applying power thereto, brake-operating mechanism, quick-motion low-power connections between said rod and brake-operating mechanism for initially operating the same, and slow-motion high-power connections between said rod and mechanism, said quick-motion connections operating to take up the slack in the connections by the application of a substantially uniform force irrespective of the amount of slack to be taken up, and means to automatically bring said high-power means into action for applying the braking power to the brake shoes after such slack has been taken up.

5. A brake-operating mechanism comprising a push-rod, means for applying power thereto, brake-operating mechanism, quick-motion slow-power connections between said rod and brake-operating mechanism for initially operating the same to take up the slack in the connections, and slow-motion high-power connections between said rod and mechanism for applying the brake power, said quick-motion slow-power connections being operated with a fixed degree of force at the beginning of each braking application irrespective of the amount of slack to be taken up.

6. A brake-operating mechanism comprising a push-rod, means for applying power to said rod, a block sliding on said rod, a brake-lever operatively connected to said block and having operating connections to the brake shoes, step-up connections between said rod and block whereby a given movement of said rod produces a greater movement of said block for the purpose of initially operating said brake-lever to take up the slack in the connections and move the brake shoes against the wheels, a direct connection betwen said rod and block for thereafter applying the braking power, and means to automatically bring said direct connection into operation as soon as the movement of the block is retarded by the brake shoes coming in engagement with the car wheels.

7. A brake-operating mechanism comprising a push-rod, means for applying power to said rod, a block sliding on said rod, a brake-lever operatively connected to said block and having operating connections to the brake shoes, step-up connections between said rod and block whereby a given movement of said rod produces a greater movement of said block for the purpose of initially operating said brake lever to take up the slack in the connections and move the brake shoes against the wheels, and a pawl and ratchet for directly connecting said rod and block for directly applying braking power to said brake-lever.

8. A brake-operating mechanism comprising a push-rod, means for applying power to said rod, a block sliding on said rod, a brake-lever operatively connected to said block and having operating connections to the brake-shoes, step-up connections between said rod and block whereby a given movement of said rod produces a greater movement of said block for the purpose of initially operating said brake-lever to take up the slack in the connections and move the brake shoes against the wheels, a pawl and ratchet for directly connecting said rod and block for directly applying braking power to said brake-lever, and means to automatically bring said direct connection into operation as soon as the movement of the block is retarded by the brake shoes coming in engagement with the car wheels.

9. A brake-operating mechanism comprising a push-rod, means for applying power to said rod, a block sliding on said rod, a brake-lever operatively connected to said block and having operating connections to the brake shoes, flexible spring step-up connections between said rod and block whereby a given movement of said rod produces a greater movement of said block for the purpose of initially operating said brake-lever to take up the slack in the connections and move the brake shoes against the wheels, and a direct connection between said rod and block for thereafter applying the braking power to said brake-lever.

10. A brake-operating mechanism comprising a push-rod, means for applying power to said rod, a block sliding on said rod, a brake-lever operatively connected to said block and having operating connections to the brake shoes, flexible spring step-up connections between said rod and block whereby a given movement of said rod produces a greater movement of said block for the purpose of initially operating said brake-lever to take up the slack in the connections and move the brake shoes against the wheels, and a pawl and ratchet for directly connecting said rod and block for directly applying braking power to said brake-lever.

11. A brake-operating mechanism comprising a push-rod having ratchet teeth thereon, means for applying power thereto, a block mounted on said rod and adapted to slide thereon, brake-operating connections operatively connected with said block, a pivoted lever operatively associated with said rod at one point and connected to said block at a second point, said connections being such that a given movement of said rod produces an increased sliding movement of said block along said rod, and a pawl carried by said block adapted to engage with the ratchet teeth on said rod to directly connect said rod and block.

12. A brake-operating mechanism comprising a push-rod having ratchet teeth thereon, means for applying power thereto, a block mounted on said rod and adapted to slide thereon, brake operating connections operatively connected with said block, a pivoted lever operatively associated with said rod at one point and connected through the medium of an expansible spring to said block at a second point, said connections being such that a given movement of said rod produces an increased sliding movement of said block along said rod, and a pawl carried by said block adapted to engage with the ratchet teeth on said rod to directly connect said rod and block.

13. A brake-operating mechanism comprising a push-rod having ratchet teeth thereon, means for applying power thereto, a block mounted on said rod and adapted to slide thereon, brake-operating connections operatively connected with said block, a pivoted lever operatively associated with said rod at one point and connected to said block at a second point, said connections being such that a given movement of said rod produces an increased sliding movement of said block along said rod, a pawl carried by said block adapted to engage with the ratchet teeth on said rod to directly connect said rod and block, and means to automatically bring said direct connection into operation as soon as the movement of the block is retarded by the brake shoes coming in engagement with the car wheels.

14. A brake-operating mechanism comprising a push-rod having ratchet teeth thereon, means for applying power thereto, a block mounted on said rod and adapted to slide thereon, brake-operating connections operatively connected with said block, a pivoted lever operatively associated with said rod at one point and connected through the medium of an expansible spring to said block at a second point, said connections being such that a given movement of said rod produces an increased sliding movement of said block along said rod, a pawl carried by said block adapted to engage with the ratchet teeth on said rod to directly connect said rod and block, and means to automatically bring said direct connection into operation as soon as the movement of the block is retarded by the brake shoes coming in engagement with the car wheels.

Signed by me at Bettendorf, Iowa, this 28 day of January, 1918.

WILLARD G. RANSOM.

Copies of this patent may be obtained for five cents each, by addressing the "Commissioner of Patents, Washington, D. C."